US008471821B2

(12) United States Patent
Dods

(10) Patent No.: US 8,471,821 B2
(45) Date of Patent: Jun. 25, 2013

(54) SYSTEM AND METHOD FOR ANALYZING MOVEMENTS OF AN ELECTRONIC DEVICE USING ROTATIONAL MOVEMENT DATA

(71) Applicant: Research In Motion Limited, Waterloo (CA)

(72) Inventor: Jeffrey Alton Hugh Dods, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 13/672,096

(22) Filed: Nov. 8, 2012

(65) Prior Publication Data

US 2013/0063360 A1    Mar. 14, 2013

Related U.S. Application Data

(63) Continuation of application No. 12/394,330, filed on Feb. 27, 2009, now Pat. No. 8,339,367.

(51) Int. Cl.
*G06F 3/02* (2006.01)
(52) U.S. Cl.
USPC .......................................... 345/169; 345/649
(58) Field of Classification Search
None
See application file for complete search history.

(56) References Cited

U.S. PATENT DOCUMENTS

2005/0212760 A1    9/2005    Marvit et al.
2008/0152202 A1    6/2008    Moise et al.
2009/0265671 A1    10/2009   Sachs et al.

FOREIGN PATENT DOCUMENTS

EP    0838945 A2    4/1998

OTHER PUBLICATIONS

Chuanjun Li et al. Segmentation and Recognition of Motion Streams by Similarity Search. ACM Transactions on Multimedia Computing, Communications and Applications. vol. 3, No. 3, Article 16. Aug. 2007.
Daniel E. Riedel et al. A Smith-Waterman Local Alignment Approach for Spatial Activity Recognition. Proceedings of the IEEE International Conference on Video and Signal Based Surveillance. Nov. 2006.
Longbin Chen. Efficient Partial Shape Matching Using Smith-Waterman Algorithm. Paper Presented in IEEE Computer Society Conference on Computer Vision and Pattern Recognition Workshops. Jun. 2008.

*Primary Examiner* — Paul Huber
(74) *Attorney, Agent, or Firm* — McCarthy Tétrault LLP

(57) ABSTRACT

The disclosure relates to a system and method for analyzing movements of a handheld electronic device. The method comprises: calculating a matching score for a rotational string representation of rotational movement data for the device to a gesture string representing a gesture related to a command for the device by recursively traversing a matrix containing the rotational string representation, the gesture string representation and earlier movement data of the device using a distance edit algorithm to generate matching scores for values of the rotational string representation against the gesture string; and if a threshold for the matching score is met, executing a command associated with the gesture on the device.

15 Claims, 12 Drawing Sheets

Constructing D(i, j)

| | | BF | C0 | C2 | C4 | C7 |
|---|---|---|---|---|---|---|
| | | 0 | 0 | 0 | 0 | 0 | 0 |
| A2 | | 0 | 0 | 1 | ½ | 0 | 0 |
| FF | | 0 | 0 | ½ | 0 | 0 | 0 |
| C7 | | 0 | 1 | ½ | 0 | 1 | 1 |
| R{m} C0 | | 0 | ½ | 2 | ½ | 1 | ½ |
| C2 | | 0 | 0 | 1 ½ | 3 | 2 ½ | 2 |
| A2 | | 0 | 0 | 1 | 2½ | 2 | 1 ½ |
| C2 | | 0 | 0 | ½ | 2 | 3 ½ | 3 |
| BF | | 0 | 1 | ½ | 1 ½ | 3 | (4 ½) |
| FF | | 0 | ½ | ½ | 1 | ½ | 4 |

G{n} column headers: { BF C0 C2 C4 C7 }

ALIGNMENT SCORE (maximum value) → 4 ½

Fig. 6A

$D_1(i, j)$ and $D_2(i, j)$ $D_{1(i,j)}$  $\{$ BF  C0  C2  C4  C7 $\}$ G$\{n\}$

| | BF | C0 | C2 | C4 | C7 |
|---|---|---|---|---|---|
| | 0 | 0 | 0 | 0 | 0 | 0 |
| A2 | 0 | 0 | 1 | ½ | 0 | 0 |
| FF | 0 | 0 | ½ | 0 | 0 | 0 |
| C7 | 0 | 1 | ½ | 0 | 1 | 1 |
| C0 | 0 | ½ | 2 | 1½ | 1 | ½ |

$R_1\{m"\}$ $D_{2(i,j)}$  $\{$ BF  C0  C2  C4  C7 $\}$ G$\{n\}$

| | BF | C0 | C2 | C4 | C7 |
|---|---|---|---|---|---|
| | 0 | ½ | 2 | 1½ | 1 | ½ |
| C2 | 0 | 0 | 1½ | 3 | 2½ | 2 |
| A2 | 0 | 0 | 1 | 2½ | 2 | 1½ |
| C2 | 0 | 0 | ½ | 2 | 3½ | 1 |
| BF | 0 | 1 | ½ | 1½ | 3 | (4½) |
| FF | 0 | ½ | ½ | 1 | 2½ | 4 |

$R_2\{m"\}$

Top Row of $D_2$ initialized by Last Row of $D_1$

ALIGNMENT SCORE

Fig. 6B $$S(x_i, y_j)$$

|    | A2 | C0 | C1 | C2 | C4 | C7 | BF | FF |
|----|----|----|----|----|----|----|----|----|
| A2 | +1 | +1 | -1 | -1 | -1 | -1 | -1 | -1 |
| C0 | +1 | +1 | +1 | -1 | -1 | -1 | -1 | -1 |
| C1 | -1 | +1 | +1 | +1 | -1 | -1 | -1 | -1 |
| C2 | -1 | -1 | +1 | +1 | +1 | -1 | -1 | -1 |
| C4 | -1 | -1 | -1 | +1 | +1 | +1 | -1 | -1 |
| C7 | -1 | -1 | -1 | -1 | +1 | +1 | +1 | -1 |
| B7 | -1 | -1 | -1 | -1 | -1 | +1 | +1 | -1 |
| FF | -1 | -1 | -1 | -1 | -1 | -1 | -1 | 1  |

Fig. 6C

|   | G₂{n} | | | | | | G₂{n'} | | | | | |
|---|---|---|---|---|---|---|---|---|---|---|---|---|
|   | {BF | C0 | C2 | C4 | C7} | | {A2 | FF | C0 | C2 | C4 | C7} |
|    | 0 | 0 | 0 | 0 | 0 | 0 | 0 | 0 | 0 | 0 | 0 | 0 |
| A2 | 0 | 0 | 1 | ½ | 0 | 0 | 0 | 1 | ½ | 0 | 0 | 0 | 1 |
| FF | 0 | 0 | ½ | 0 | 0 | 0 | 0 | ½ | 2 | 1½ | 1 | ½ | 0 |
| C7 | 0 | 1 | ½ | 0 | 1 | 1 | 0 | 0 | 1½ | 3 | 2½ | 2 | 1½ |
| C0 | 0 | ½ | 2 | 1½ | 1 | 1½ | 0 | 1 | 1 | 2½ | 4 | 3½ | 3 |
| C2 | 0 | 0 | 1½ | 3 | 2½ | 2 | 0 | ½ | ½ | 2 | 3½ | 5 | 4½ |
| A2 | 0 | 0 | 1 | 2½ | 2 | 1½ | 0 | 1 | ½ | 1½ | 3 | 4½ | 6 |
| C2 | 0 | 0 | ½ | 2 | 3½ | 3 | 0 | 0 | 0 | 1½ | 2½ | 4 | 5½ |
| BF | 0 | 1 | ½ | 1½ | 3 | 4½ | 0 | 0 | 0 | 1 | 2 | 3½ | 5 |
| FF | 0 | ½ | ½ | 1 | 2½ | 4 | 0 | 0 | 0 | ½ | 1½ | 3 | 4½ |

R{m}

Alignment Score 1 → 4½

Alignment Score 2 → 6

Fig. 6D

SYSTEM AND METHOD FOR ANALYZING MOVEMENTS OF AN ELECTRONIC DEVICE USING ROTATIONAL MOVEMENT DATA

RELATED APPLICATION

This application is a continuation application of U.S. patent application Ser. No. 12/394,330 filed on Feb. 27, 2009.

FIELD OF DISCLOSURE

This disclosure relates to a system and method for analyzing movements of an electronic device. In particular, the disclosure relates to analyzing rotational movements of a device, which may be used to identify gestures as input signals for the device.

BACKGROUND

Current wireless handheld mobile communication devices perform a variety of functions to enable mobile users to stay current with information and communications, such as e-mail, corporate data and organizer information while they are away from their desks. Such devices have displays and sophisticated operating systems providing Graphical User Interfaces (GUIs) that impart various static and moving images to the user.

One navigation device for a GUI of a handheld device is a trackball or trackwheel. Movement of the trackball or trackwheel is commonly translated into a movement of a cursor, which may involve highlighting an icon. However utilizing a trackball or trackwheel is not inherently intuitive. Other navigation devices utilize a movement of the device itself. However interpreting such movements with present algorithms is computationally demanding and requires relatively large processing power and memory storage, especially for a handheld device.

There is a need for a system and method which addresses deficiencies in the prior art.

BRIEF DESCRIPTION OF THE DRAWINGS

The disclosure provides, by way of example only, with reference to the accompanying drawings, in which:

FIG. 6A is a block diagram of a dynamic programming matrix resulting from evaluating a stored pattern gesture against movement data of the device of FIG. 1, according to an embodiment;

FIG. 6B is a block diagram of two dynamic programming matrices resulting from evaluating a stored pattern gesture against two sets of movement data of the device of FIG. 1, according to an embodiment;

FIG. 6C is an exemplary substitution matrix generated as part of processing movement data by the device of FIG. 1 according to an embodiment;

FIG. 6D is a block diagram of a dynamic programming matrix resulting from evaluating two stored pattern gestures against movement data of the device of FIG. 1, for multiple gestures according to an embodiment;

DETAILED DESCRIPTION OF AN EMBODIMENT

Figure 1:
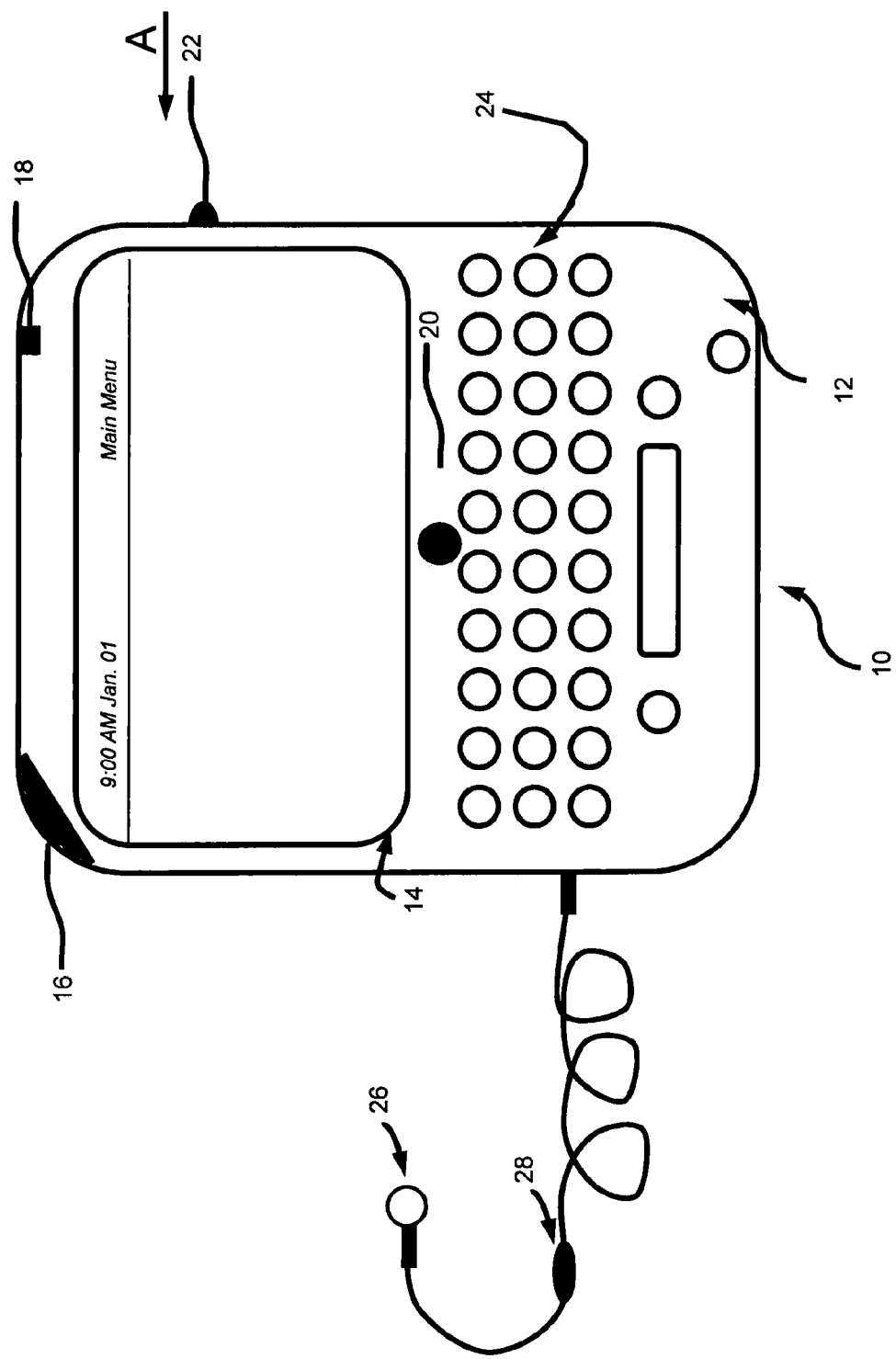
FIG. 1 is a schematic representation of an electronic device having a gesture analysis system and a movement detection system in accordance with an embodiment.

The description which follows and the embodiments described therein are provided by way of illustration of an example or examples of particular embodiments of the principles of the present disclosure. These examples are provided for the purposes of explanation and not limitation of those principles and of the disclosure. In the description which follows, like parts are marked throughout the specification and the drawings with the same respective reference numerals.

In a first aspect of an embodiment, a method for analyzing movements of a handheld electronic device is provided. The method comprises: calculating a matching score for a rotational string representation of rotational movement data for the device to a gesture string representing a gesture related to a command for the device by recursively traversing a matrix containing the rotational string representation, the gesture string representation and earlier movement data of the device using a distance edit algorithm to generate matching scores for values of the rotational string representation against the gesture string; and if a threshold for the matching score is met, executing a command associated with the gesture on the device.

In the method, the rotational string representation may be generated by converting the rotational movement data to a magnitude value representing at least one axis of rotation for a rotational movement.

In the method, a gyroscope may provide the rotational movement data for the device.

In the method, the threshold may discard contiguously repeated enumeration symbols in the rotational string representation.

In the method, the distance edit algorithm may be a Smith-Waterman algorithm.

In the method, the matrix may be a programming matrix $D(i, j)$, comprising:

dimensions m×n, where m is the length of the rotational string representation and n is the length of the gesture string, with components of the rotational string representation being identified with the m dimension and components of the gesture string being identified with the n dimension, a leftmost column $D(i,0)=0$ $i=0 \ldots m$; and a top row $D(0,j)=0, j=0 \ldots n;$ and remaining elements in the matrix are set to be the minimum value of 0 or one of:

$$D(i, j) = \max\{0 \text{ [or] } D(i-1, j) + \text{a gap penalty [or] } D(i, j-1) +$$
$$\text{the gap penalty [or] } D(i-1, j-1) + \text{the } i,$$
$$j \text{th entry of the substitution matrix}\}.$$

In the method, the rotational string representation and the earlier movement data may be used in calculating the matching score to determine if the gesture string straddles the rotational string representation and the earlier movement data.

The method may further comprise: tracking linear movement data for the device; mapping the linear movement data to a text string representation; comparing the text string representation against a second string representing the gesture as a linear movement and a second threshold; and executing the command associated with the gesture on the device if the second threshold is met.

In a second aspect of an embodiment, a system for analyzing movements of a handheld electronic device is provided. The system comprises: a memory storage device; a microprocessor; a first module to generate rotational movement data for the handheld electronic device responsive to movements of the handheld electronic device; a second module providing instructions to the microprocessor to map the rotational movement data to a rotational string representation relating to at least one of a magnitude, speed and acceleration of a rotational movement detected along an axis of rotation for the handheld electronic device and store the string representation in the memory storage device; and a third module providing instructions to the microprocessor to calculate a matching score for the rotational string representation to a gesture string representing a gesture related to a command for the electronic handheld device by recursively traversing a matrix containing the rotational string representation, the gesture string representation and earlier movement data of the handheld electronic device using a distance edit algorithm to generate matching scores for values of the rotational string representation against the gesture string, and execute a command associated with the gesture on the handheld electronic device when a threshold for the matching score is met.

In the system, the first module may comprise a gyroscope.

In the system the third module may provide instructions to the microprocessor to implement a Smith-Waterman algorithm for the distance edit algorithm to generate the matching scores.

In the system, the matrix may be a programming matrix D(i, j), comprising:

dimensions m×n, where m is the length of the string representation and n is the length of the gesture string, with components of the string representation being identified with the m dimension and components of the gesture string being identified with the n dimension, a leftmost column $D(i,0)=0, i=0 \ldots m$; and a top row $D(0,j)=0, j=0 \ldots n$;

and remaining elements in the matrix are set to be the minimum value of 0 or one of:

$$D(i, j) = \max\{0 \text{ [or] } D(i-1, j) + \text{a gap penalty [or] } D(i, j-1) +$$
$$\text{the gap penalty [or] } D(i-1, j-1) + \text{the } i,$$
$$j \text{th entry of the substitution matrix}\}.$$

In the system, the third module may provide instructions to the microprocessor to utilize the string representation and the earlier movement data to determine if the gesture string straddles the string representation and the earlier movement data.

The system may further comprise: a fourth module to generate linear movement data for the handheld electronic device responsive to linear movements of the handheld electronic device; a fifth module providing instructions to the microprocessor to map the linear movement data to a text string representation and store the text string representation in the memory storage device; a sixth module providing instructions to the microprocessor to analyze data relating to the text string representation and earlier movement data, if available, for the handheld electronic device against data relating to a linear gesture string representing the gesture, and compare the text string representation against the threshold to determine if the string representation matches the linear gesture string; and a seventh module providing instructions to the microprocessor to process results of the third and sixth modules to determine whether to execute the command associated with the gesture on the handheld electronic device.

In the system, the first module may comprise a gyroscope.

In the system, the third module may provide instructions to the microprocessor to discard contiguously repeated enumeration symbols in the rotational string representation.

In another aspect, a method for analyzing movements of a handheld electronic device is provided. The method comprises: tracking angular speed data for the device; mapping the angular speed data to a string representation; analyzing the string representation of the movements against a gesture string representing a gesture signature related to a command for the device to determine if the gesture has been imparted on the device; and if the string representation of the movement matches the gesture string, executing a command associated with the gesture on the device.

In the method the string representation may utilize earlier data, if available.

In the method the string representation may be compared against a corresponding threshold to determine if the string representation matches the gesture string representation.

In the method, mapping the angular speed data to the string representation may comprise: converting the individual angular speed data components to a single angular speed vector representing the total angular speed; and mapping the magnitude of the total angular speed vector against a line of points to identify an enumeration symbol of the enumeration symbols that matches the magnitude of the total angular speed.

In the method, a tri-axis gyroscope may provide the angular speed data for the string representation.

In the method, the gyroscope string representation may be taken with other data, such as linear accelerometer data to describe the motion of the device.

In the method, analyzing the string representation may utilize a threshold that discards contiguously repeated enumeration symbols in the string representation.

In the method, the string may be analyzed using an edit distance algorithm, such as a Levenshtein edit distance algorithm or a Smith-Waterman algorithm. Additionally or alternatively, another sequence alignment algorithm may be used.

In the method, analyzing the rotational string representation may comprise: constructing a matrix of data containing the string and the corresponding gyroscopic gesture signature string; and calculating an alignment score between the two by traversing a subset of the matrix to generate matching scores for values in rotational string against the values in gesture string or between the rotational string and any number of gyroscope gesture signature strings.

In the method, constructing the matrix of data may use earlier data of the device; and calculating the alignment score may utilize a Smith-Waterman algorithm to recursively traverse a subset of the matrix until a stop condition is encountered.

In the method, the matrix may be a dynamic programming matrix $D(i, j)$. The matrix may have dimensions m×n, where m is the length of the string representation and n is the length of the gesture string. The matrix may have components of the string representation being identified with the m dimension and components of the gesture string being identified with the n dimension. The matrix may have a leftmost column $D(i,0)=0$, where $i=0 \ldots m$; and a top row $D(0,j)=0$, where $j=0 \ldots n$. The remaining elements in the matrix may be set to be the minimum value of 0 or one of:

$$D(i, j) = \max\{0 \text{ [or] } D(i-1, j) + \text{a gap penalty [or] } D(i, j-1) + \text{the gap penalty [or] } D(i-1, j-1) + \text{the } i, j \text{ th entry of the substitution matrix}\}.$$

In the method, calculating the alignment score may utilize portions of the previous dynamic programming matrix in case the current string mapping happens to straddle the gesture signature string.

The method may further comprise: tracking linear movement data for the device; mapping the linear movement data to a linear string representation; analyzing the linear string representation against a second string representing the gesture as a linear movement; and utilizing results of the linear string analysis and the rotational string analysis to determine whether to execute the command associated with the gesture on the device. The linear string may be a text string.

In the method, results of the linear string analysis and the rotational string analysis may be applied to an arithmetic function to determine whether to execute the command associated with the gesture on the device.

In yet another aspect, a system for analyzing movements of a handheld electronic device is provided. The system comprises: a memory storage device; a microprocessor; a first module to generate rotational movement data responsive to movements of the device; a second module providing instructions to the microprocessor to map the rotational movement data to a string representation relating to at least one of a magnitude, speed and acceleration of rotational movement detected along at least one axis of rotation associated with the device and store the string representation in the memory storage device; and a third module providing instructions to the microprocessor. The third module analyzes data relating to the string representation and earlier movement data, if available, for the device against data relating to a gesture string representing a gesture related to a command for the device to determine if the gesture has been imparted on the device; and compares the string representation against a threshold to determine if the string representation matches the gesture string and executes a command associated with the gesture on the device.

In the system, the first module may comprise a gyroscope to provide the rotational movement data for the device.

In the system, the first module may comprise a 3-axis gyroscope to provide angular velocities.

In the system, the second module may also: convert the angular speed data components to a single vector representing the total angular speed, comprised of the angular speeds measured around the x, y, and z axis, i.e. $\alpha$, $\beta$, and $\gamma$, and mapping the magnitude of the total angular speed vector against a finite line of points to identify an enumeration symbol of the enumeration symbols that matches the angular movement.

In the system, the third module may utilize one of a sequence alignment or an edit distance algorithm to evaluate the string representation against the threshold.

In the system, the third module may provide instructions to the microprocessor to: construct a matrix of data containing the string representation and the gesture string; and calculate a matching score for the string representation against the gesture string by traversing a subset of the matrix to generate matching scores for values in the string representation against the gesture string.

In the system, the third module may utilize the string representation and the earlier movement data collectively to determine if the gesture string straddles the string representation and the earlier movement data.

In the system, the third module may analyze the string representations against established thresholds using an edit distance algorithm, such as a Levenshtein edit distance algorithm or a Smith-Waterman algorithm. Additionally or alternatively, another sequence alignment algorithm may be used.

In the system, the matrix may be a programming matrix $D(i, j)$, comprising: dimensions m×n, where m is the length of the string representation and n is the length of the gesture string, with components of the string representation being identified with the m dimension and components of the gesture string being identified with the n dimension, a leftmost column $D(i,0)=0, i=0 \ldots m$; and a top row $D(0,j)=0, j=0 \ldots n$.

Also, the remaining elements in the matrix may be set to be the minimum value of 0 or one of:

$$D(i, j) = \max\{0 \text{ [or] } D(i-1, j) + \text{a gap penalty [or] } D(i, j-1) + \text{the gap penalty [or] } D(i-1, j-1) + \text{the } i, j \text{ th entry of the substitution matrix}\}.$$

The system may further comprise: a fourth module to generate linear movement data for the device responsive to linear movements of the device; a fifth module providing instructions to the microprocessor to map the linear movement data to a linear string representation relating to linear movement of the device and store the linear string representation in the memory storage device; and sixth and seventh modules providing instructions to the microprocessor. The sixth module provides instructions to analyze data relating to the linear string representation and earlier movement data, if available, for the device against data relating to a linear gesture string representing the gesture; and compares the linear string representation against a threshold to determine if the string representation matches the linear gesture string. The seventh module provides instructions to the microprocessor to process results of the third and sixth modules to determine whether to execute the command associated with the gesture on the device.

In other aspects, various combinations of sets and subsets of the above aspects are provided.

Generally, an embodiment provides a system and method of tracking movements of a (handheld) device and evaluating the movements against stored representations of selected movements of interest, referred to herein as "gestures". An embodiment utilizes a quantization scheme which maps movements of the device to a line. The line has a predetermined set of symbols associated with specific points in the line. The symbols may be any predefined set of characters, including ASCII set characters, integers, or any other enumeration scheme. A detected movement is quantized, where the movement is broken down into temporal segments and each segment is mapped (as an approximation) onto the points in the line. One embodiment tracks rotational movement data as part of the detected movement. The symbols at the mapped points for the movement provide a "text string", which represents the movement as mapped against the points in the line. Meanwhile, a set of (input) gestures, each representing a command implemented as a movement of the device which is recognized by an application operating on the device, are also quantized against the points on the line. As such, the gestures are associated with a discrete sequence of symbols (again, which may be represented by ASCII set characters, or integers, or any other convenient enumeration scheme) and are referred to below as "pattern strings".

The sets of pattern strings for gestures may be stored or made available to the device so that they can be compared against real-time movements of the device as encoded in the text strings. At certain instances, recently detected movements of the device (represented by text strings) may be compared against sets of stored gestures (represented by stored pattern strings) to evaluate whether a movement matches a stored gesture. An algorithm, expanded upon a basic Smith-Waterman algorithm may be used as part of the evaluation. The evaluation may have thresholds to set a tolerance of deviations from a gesture and the detected movements.

Exemplary details of aspect of embodiments are provided herein. First, a description is provided on general concepts and features of an embodiment as provided in a device. Then, further detail is provided on the system, data and algorithms used to process detected movements of a device and to compare the movements against stored representations of gestures.

Figure 2:
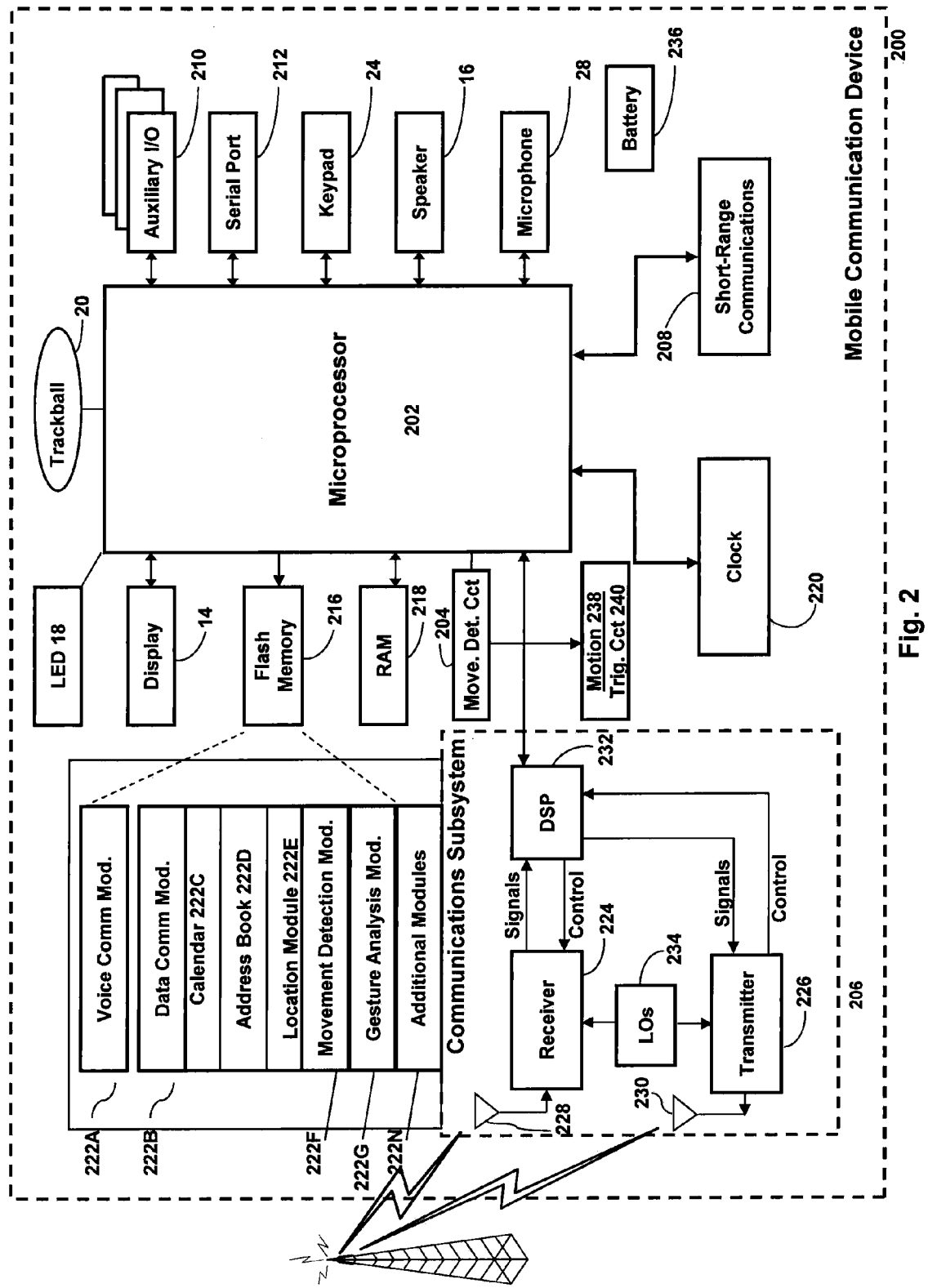
FIG. 2 is a block diagram of certain internal components and the movement adjustment system in device of FIG. 1.

As such, referring to FIGS. 1 and 2, some general features of a device are first provided. FIG. 1 provides general features of an electronic device for receiving electronic communications in accordance with an embodiment of the disclosure, which is indicated generally at 10. In the present embodiment, electronic device 10 is based on a computing platform having functionality of an enhanced personal digital assistant with cell phone and e-mail features. It is, however, to be understood that electronic device 10 can be based on construction design and functionality of other electronic devices, such as smart telephones, desktop computers pagers or laptops having telephony equipment. In a present embodiment, electronic device 10 includes a housing 12, an LCD 14, speaker 16, an LED indicator 18, a trackball 20, an ESC ("escape") key 22, keypad 24, a telephone headset comprised of an ear bud 26 and a microphone 28. Trackball 20 and ESC key 22 can be inwardly depressed along the path of arrow "A" as a means to provide additional input to device 10.

It will be understood that housing 12 can be made from any suitable material as will occur to those of skill in the art and may be suitably formed to house and hold all components of device 10.

Device 10 is operable to conduct wireless telephone calls, using any known wireless phone system such as a Global System for Mobile Communications (GSM) system, Code Division Multiple Access (CDMA) system, CDMA 2000 system, Cellular Digital Packet Data (CDPD) system and Time Division Multiple Access (TDMA) system. Other wireless phone systems can include Wireless WAN (IMS), Wireless MAN (Wi-max or IEEE 802.16), Wireless LAN (IEEE 802.11), Wireless PAN (IEEE 802.15 and Bluetooth), etc. and any others that support voice. Additionally, a Bluetooth network may be supported. Other embodiments include Voice over IP (VoIP) type streaming data communications that can simulate circuit-switched phone calls. Ear bud 26 can be used to listen to phone calls and other sound messages and microphone 28 can be used to speak into and input sound messages to device 10.

Referring to FIG. 2, functional components of device 10 are provided in schematic 200. The functional components are generally electronic, structural or electro-mechanical devices. In particular, microprocessor 202 is provided to control and receive almost all data, transmissions, inputs and outputs related to device 10. Microprocessor 202 is shown schematically as coupled to keypad 24 and other internal devices. Microprocessor 202 preferably controls the overall operation of the device 10 and its components. Exemplary microprocessors for microprocessor 202 include microprocessors in the Data 950 (trade-mark) series, the 6200 (trade-mark) series and the P4900 (trade-mark) series, all available at one time from Intel Corporation. Microprocessor 202 is connected to other elements in device 10 through a series of electrical connections to its various input and output pins. Microprocessor 202 has an IRQ input line which allows it to receive signals from various devices. Appropriate interrupt firmware is provided which receives and reacts to the signals detected on the IRQ line. Movement detection module 204 provides analysis of input signals to determine the whether device 10 has been moved or whether its orientation has changed.

In addition to microprocessor 202, other internal devices of the device 10 are shown schematically in FIG. 2. These include: display 14; speaker 16; keypad 24; communication sub-system 206; short-range communication sub-system 208; auxiliary I/O devices 210; serial port 212; microphone 28; flash memory 216 (which provides persistent storage of data); random access memory (RAM) 218; internal clock 220 to track and synchronize applications and other device subsystems (not shown). Device 10 is preferably a two-way radio frequency (RF) communication device having voice and data communication capabilities. In addition, device 10 preferably has the capability to communicate with other computer systems through networks such as the Internet.

Operating system software executed by the microprocessor 202 is preferably stored in a computer readable medium, such as flash memory 216, but may be stored in other types of memory devices, such as read only memory (ROM) or similar storage element. In addition, system software, specific device applications, or parts thereof, may be temporarily loaded into a volatile store, such as RAM 218. Communication signals received by the mobile device may also be stored to RAM 218.

Microprocessor 202, in addition to its operating system functions, enables execution of software applications on device 10. A set of software (and/or firmware) applications, referred to generally as applications 222, that control basic device operations, such as voice communication module 222A and data communication module 222B, may be installed on the device 10 during manufacture or downloaded thereafter. As well, additional software modules, which may be for instance a personal information manager (PIM) application, may be installed during manufacture or downloaded thereafter into device 10. Data associated with each application can be stored in flash memory 216.

Telephone application 222A (which is associated with icon 304A) provides an interface to allow the user of device 10 to initiate a telephone call on device 10. It also provides a GUI to store and list a record of telephone calls made, telephone calls received and voice-mail messages stored by device 10.

Email application 222B (which is associated with icon 304B) provides modules to allow user of device 10 to generate email messages on device 10 and send them to their addressees. Application 222B also provides a GUI which provides a historical list of emails received, drafted, saved and sent.

Calendar 222C (which is associated with icon 304C) tracks appointments and other status matters relating to the user and device 10. It provides a daily/weekly/month electronic schedule of appointments, meetings and events as entered by the user. Calendar 222C tracks time and day data for device 10 using processor 202 and internal clock 220. The schedule contains data relating to the current availability of the user. For example it can indicate when the user is busy, not busy, available or not available. The application can also provide a "do not disturb" window of time for a user. Effectively, calendar 222C allows device 10 to be set to not notify the user when an interrupt event occurs, in spite of any lack of scheduled appointments during that window.

Address book 222D (which is associated with icon 304D) enables device 10 to store contact information for persons and organizations. In particular, name, address, telephone numbers, e-mail addresses, cell phone numbers and other contact information are stored in linked records. The data is stored in non-volatile memory, such as memory 216 in device 10 in a database. In use, the database is organized such that individual contact information can be accessed and cross referenced to other data in the same or other applications.

Location module 222E (which is associated with icon 304E) provides the current geographic location of device 10. In one embodiment, it receives and interprets remote GPS signals from a system of satellites to triangulate the current location of device 10, using, for example GPS modules and applications known in the art. On device 10, a GPS interface application controls the storage of GPS data retrieved by location module 222E. Alternatively, location information may be determined by analyzing encoded data relating to cellular telephone calls executed on device 10. For example, the encoded data stream can be examined to identify the current base station to which device 10 is communicating.

Movement detection module 222F receives data from a movement detection device, converts and stores the data so that it may be processed by other modules. Further details on module 222F are provided below Gesture analysis module 222G receives movement data, as provided and processed by movement detection module 222F and then analyzes the movement data against representations of stored gestures. If a match is provided, then the gesture analysis module can activate a signal or process to execute a command associated with the recognized gesture. The command may relate to another application operating on device 10. Further details on module 222G is provided below.

Movement detection circuit 204, motion circuit 238 and trigger circuit 240 provide systems and devices to detection movements of device 10 and to set thresholds for detectable movements. Further details on these elements are provided below.

Communication functions, including data and voice communications, are performed through the communication sub-system 206 and the short-range communication sub-system 208. Collectively, sub-systems 206 and 208 provide the signal-level interface for all communication technologies processed by device 10. Various applications 222 provide the operational controls to further process and log the communications. Communication sub-system 206 includes receiver 224, transmitter 226 and one or more antennas, illustrated as receive antenna 228 and transmit antenna 230. In addition, communication sub-system 206 also includes processing module, such as digital signal processor (DSP) 232 and local oscillators (LOs) 234. The specific design and implementation of communication sub-system 206 is dependent upon the communication network in which device 10 is intended to operate. For example, communication sub-system 206 of device 10 may operate with the Mobitex (trade-mark), DataTAC (trade-mark) or General Packet Radio Service (GPRS) mobile data communication networks and also operate with any of a variety of voice communication networks, such as Advanced Mobile Phone Service (AMPS), Time Division Multiple Access (TDMA), Code Division Multiple Access CDMA, Personal Communication Service (PCS), Global System for Mobile Communication (GSM), etc. Other types of data and voice (telephonic) networks, both separate and integrated, may also be utilized with device 10. In any event, communication sub-system 206 provides device 10 with the capability of communicating with other devices using various communication technologies, including instant messaging (IM) systems, text messaging (TM) systems and short message service (SMS) systems.

In addition to processing communication signals, DSP 232 provides control of receiver 224 and transmitter 226. For example, gains applied to communication signals in receiver 224 and transmitter 226 may be adaptively controlled through automatic gain control algorithms implemented in DSP 232.

In a data communication mode, a received signal, such as a text message or web page download, is processed by the communication sub-system 206 and is provided as an input to microprocessor 202. The received signal is then further processed by microprocessor 202 which can then generate an output to display 14 or to an auxiliary I/O device 210. A device user may also compose data items, such as e-mail messages, using keypad 24, trackball 20 and/or some other auxiliary I/O device 210, such as a touchpad, a rocker switch, a separate thumbwheel or some other input device. The composed data items may then be transmitted over communication network 140 via communication sub-system 206. Sub-system 206 may also detect when it is out of communication range for its remote systems.

In a voice communication mode, overall operation of device 10 is substantially similar to the data communication mode, except that received signals are output to speaker 16, and signals for transmission are generated by microphone 28. Alternative voice or audio I/O sub-systems, such as a voice message recording sub-system, may also be implemented on device 10. In addition, display 14 may also be utilized in voice communication mode, for example, to display the identity of a calling party, the duration of a voice call, or other voice call related information.

Short-range communication sub-system 208 enables communication between device 10 and other proximate systems or devices, which need not necessarily be similar devices. For example, the short-range communication sub-system may include an infrared device and associated circuits and components, or a Bluetooth (trade-mark) communication module to provide for communication with similarly-enabled systems and devices.

Powering the entire electronics of the mobile handheld communication device is power source 236. Preferably, the power source 236 includes one or more batteries. More preferably, the power source 236 is a single battery pack, especially a rechargeable battery pack. A power switch (not shown) provides an "on/off" switch for device 10. Upon activation of the power switch an application 222 is initiated to turn on device 10. Upon deactivation of the power switch, an application 222 is initiated to turn off device 10. Power to device 10 may also be controlled by other devices and by software applications 222.

Now, further details are provided on features of an embodiment relating to detection of movements, such as rotational movements, and analyzing such movements against representations of predetermined gestures to determine if a movement matches a gesture.

Figure 3:
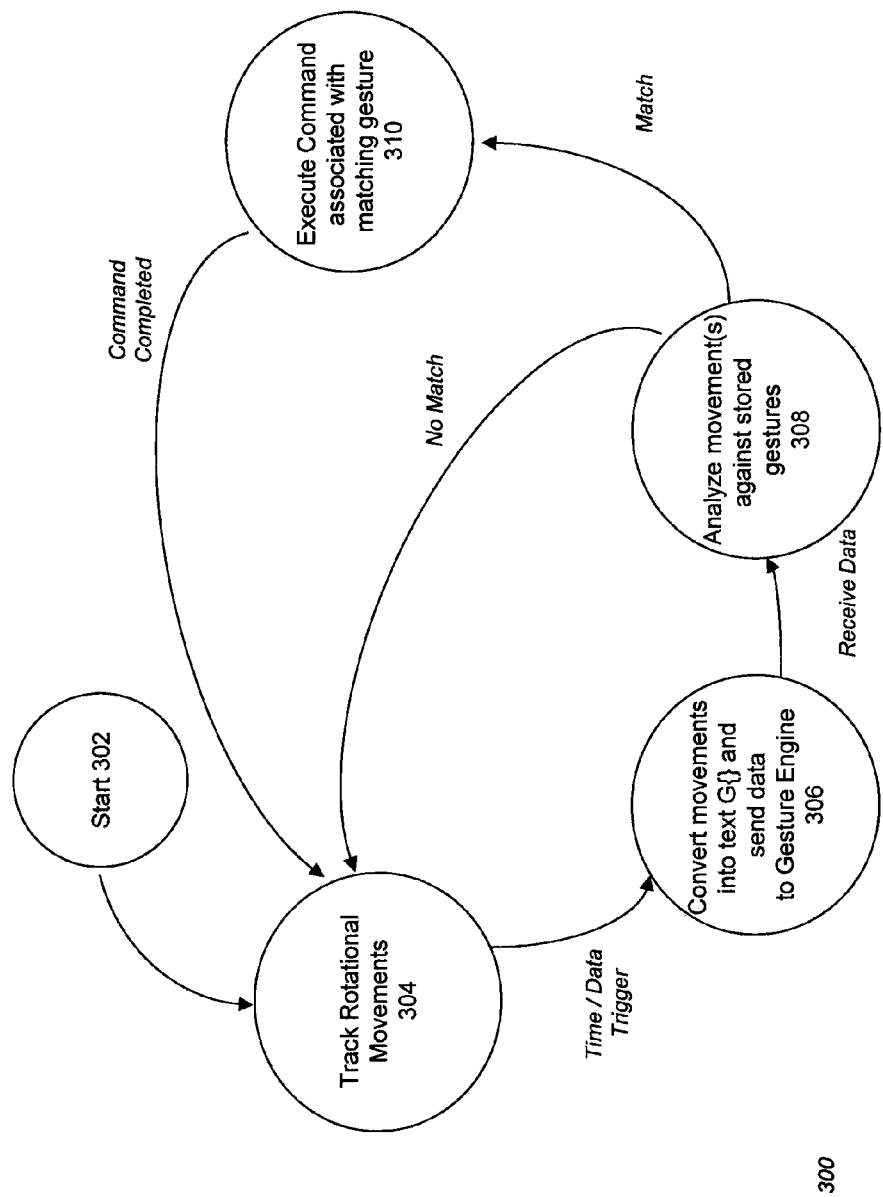
FIG. 3 is a state diagram of functions performed in processing movements of the device of FIG. 1.

Referring to FIG. 3, state diagram 300 provides an exemplary progression of activities, shown as states, that device 10 transits in, to and through as it receives movement data and processes it to determine whether a movement matches a stored representation of a gesture. In an embodiment, actions conducted in a state are executed by gesture analysis module 222G and/or other processes and modules operating on device 10. Movement data is provided by one or more of motion detection circuit 204, motion circuit 238 and trigger circuit 240.

The process begins at step 302, where device 10 is operating, which then progresses to state 304 where movements are tracked. As movements may occur at any time, this process may be operating as a background process in device 10. Movement detection module 222F monitors for, tracks and stores movement signals from one or more of motion detection circuit 204, motion circuit 238 and trigger circuit 240. At certain intervals (for example time, number of readings or predefined triggering events) the movement data is converted into a normalized format and then provided to gesture module 222G in state 306. Next at state 308, the frame of data is received and analyzed against representations of predetermined gestures. If there is a match of a movement against a gesture, then device 10 moves to state 310, where a command associated with the gesture is executed. The command may be for a specific application operating on device 10. A gesture may have different contexts for different applications or even at different instances within the same application. Once the command is completed, device 10 returns to state 304 to track more movements. If there is no match of a movement against a gesture, then device returns to state 304. Further detail on functions and processing conducted in state 308 is provided below.

As part of the movement data analysis, an embodiment uses rotational movement data detected by device 10. Further details on how an embodiment detects and utilizes such data are provided below.

Figure 4:
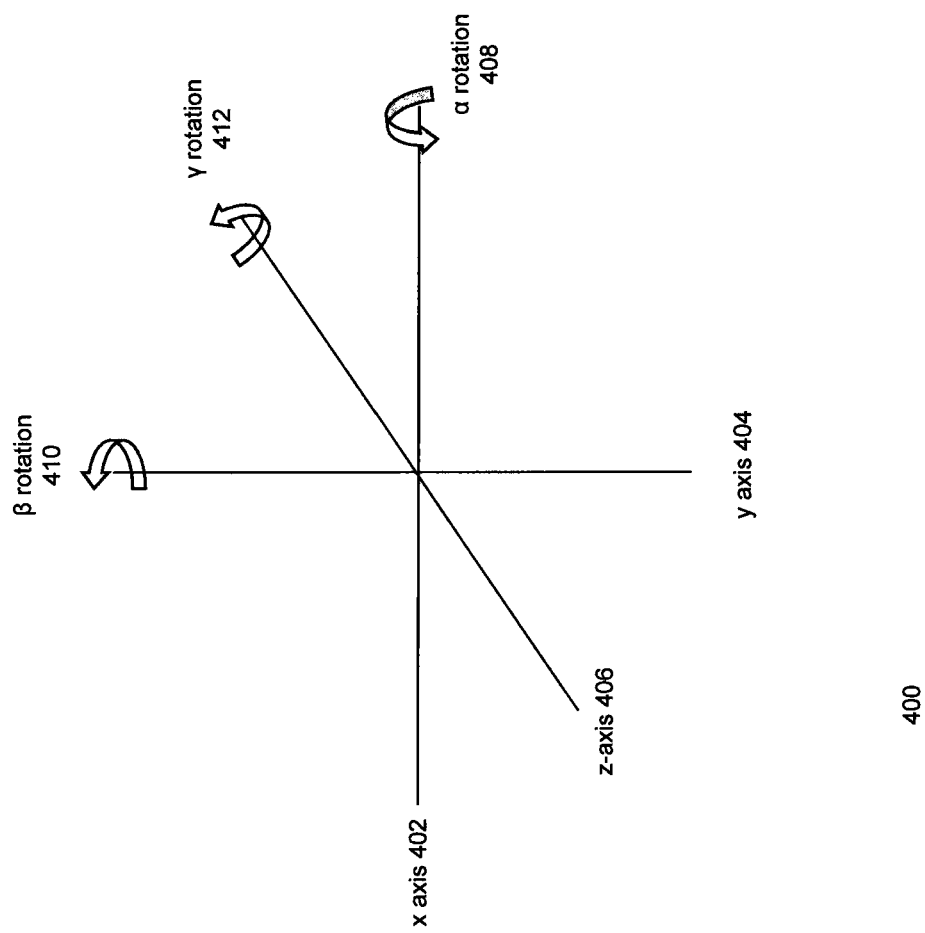
FIG. 4 is a schematic block diagram of linear and rotational movements along and around the x, y and z axis which are tracked by the device of FIG. 1.

Referring to FIG. 4, Cartesian coordinate system 400 is shown, having x-axis 402, y-axis 404 and z-axis 406. Linear movement of device 10 may be detected by a motion detection circuit 204. An example of a linear movement is when device 10 is resting on a table and it is pushed in one direction along the table. The imparted movement may have any one or more of an x, y, and z component in its magnitude and direction. Also the movement may be tracked in a different coordinate system, such as a spherical coordinate system.

In addition to linear movements in the x-axis 402, y-axis 404 and/or z-axis 406, rotational movements around one or more of the axis, as indicated by α, β and γ, may be imparted on device 10. An example of a rotational movement is when device 10 is resting on a table and it is spun about a point on the table. In that situation, there is a rotational movement of device 10 on the table, but no linear movement of device 10. Another exemplary rotational movement would be holding device 10 in a user's hands and rotating the device along its transverse axis in left and right rotational directions. Again, there is a rotational movement of device 10, but no linear movement of device 10. Rotational movements around the x, y and z axis, noted by rotational indices α, β and γ are labelled as indices 408, 410 and 412 respectively. Such rotational directions are sometimes referred to as roll, pitch and yaw. Rotational movements can be positive (clockwise) or negative (counter-clockwise) around any axis. Rotational movements can combine rotations in one or more of the α, β and γ components. Rotational movements may also be tracked in a different coordinate system, such as a spherical coordinate system. Rotational movement can be expressed as angular velocity in units of, for example, degrees/second. Angular velocity can be measured by a gyroscope on device 10.

With linear and rotational movements described, it will be appreciated that a movement of device 10 may be a combination of linear and rotational movements. An embodiment provides tracking of rotational movements and mapping of same against predetermined rotational signature for a gesture. If there is a sufficient matching of the detected rotational movement against the signature, then a 'match' is noted and a command associated with the gesture may be implemented. Ranges and thresholds may apply a comparison of a quantitized value of the rotational movement with the signature to determine if there is a sufficient match.

For example, a predetermined gesture for device 10 may be a rotational movement about its β-axis (akin to the left and right rotation of device 10 noted earlier). There may be minimum/maximum time and degrees of rotation for the signature. For example, the signature may require that the rotation be at least 15 degrees from the transverse axis in both directions and that the rotations be imparted first in a left-wise rotation, then a right wise rotation. It will be appreciated that other gestures may have other thresholds.

Figure 5:
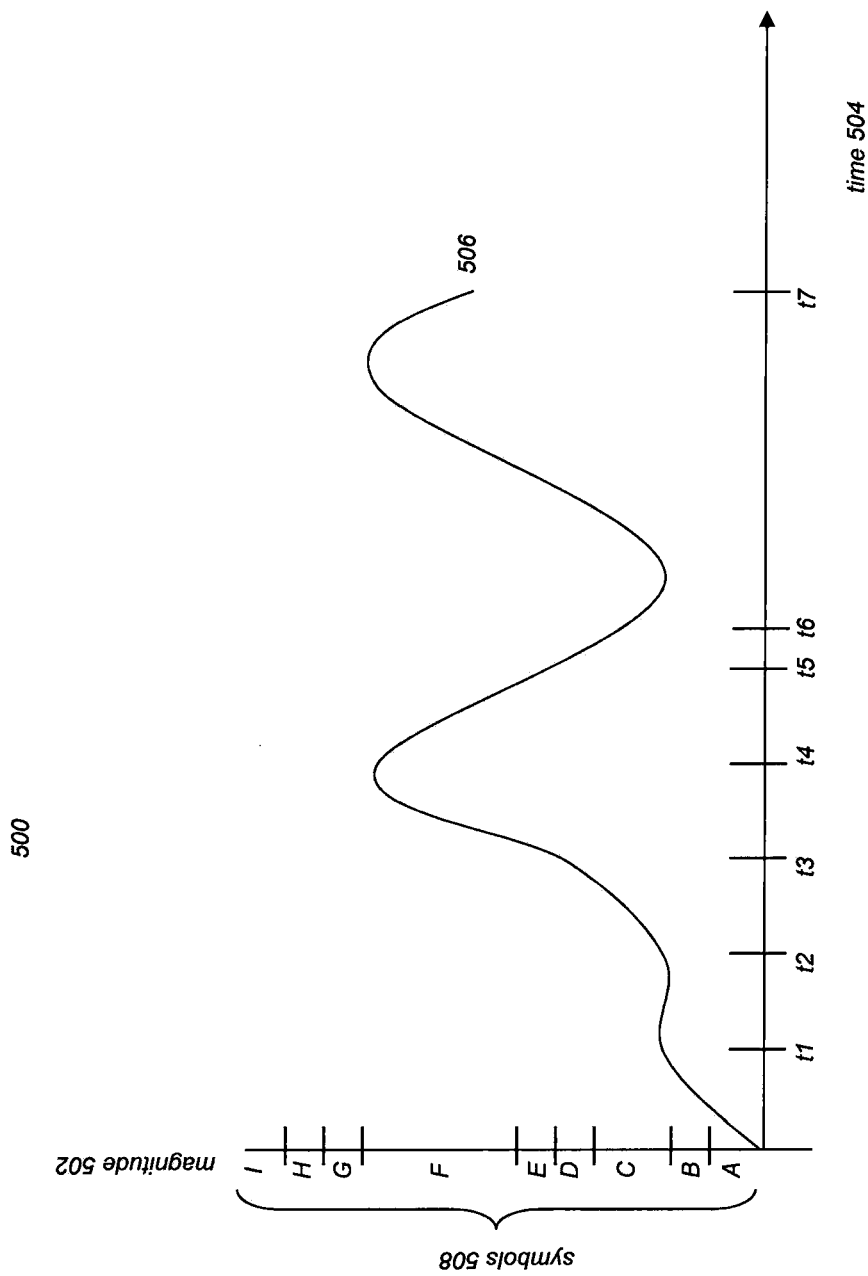
FIG. 5 is a graph of magnitudes of rotational movements along the x, y and z axis against time which are tracked by the device of FIG. 1.

Referring to FIG. 5, further detail is now provided on rotational movement processing by an embodiment. When movements of device 10 are detected by one or more of motion detection circuit 204, motion circuit 238 and trigger circuit 240, rotational movement data is processed. As real-time movement data is received, it may be processed, figuratively and/or actually, into different formats and bundles to assist with its analysis. One form is provided in graph 500, where each quantified rotational movement value is charted for its magnitude in the y-axis 502 against time in the x-axis 504. Graph line 506 represents the magnitude of a rotational movement detected at a given time. The movement may be tracked as a magnitude of a velocity, speed, acceleration or other detected motion at a given time. In one embodiment, graph 506 represents the net absolute magnitude of rotational speed at a given instant of time in all of the α, β and γ components. In other embodiments, a graph may represent the magnitude of rotation movements (or other speed or acceleration related motions) at a given instant of time of selected combinations of one or more of the α, β and γ.

In order to convert rotational data into one value representing a net rotational magnitude the Pythagorean theorem in 3-dimensions may be applied:

$$r_g = \sqrt{\alpha^2 + \beta^2 + \gamma^2} \qquad \text{Equation 1}$$

It is the $r_g$ value that may be used in graph 500. The $r_g$ value may be adjusted for units of measurement or data manipulation requirements as needed. Also, the $r_g$ value may be set according to a quantization scale for the y-axis 502. For example $r_g$ values may be rounded to the nearest, highest, or lowest integer or 5, 10, 25, 50, 100, etc. level in the y-axis. The scale may or may not be linear. A non-linear scale may allow for smaller rotational values to be grouped together in one block, to provide some filtering of "minor" rotational movements. Similarly, large rotational values may be grouped together in one block. Where a particular range of rotational movements are deemed to require precise movement tracking, the scale may provide more precision in that range. The values may depend on the numeric data generated by module 222F. The values of graph 500 may be stored in any data structure known to those of skill in the art, such as an array.

For processing convenience, the y-axis scale may be mapped into a series of symbols 508. For the range shown, symbols A, B, C, I, . . . are provided. As such, a given detected movement can be expressed as a stream of "text", where each element in the text represents a magnitude of detected movement. The string R{m} provides a representation of the movement. As such, the basic movement data detected by one or more of motion detection circuit 204, motion circuit 238 and trigger circuit 240 may be mathematically translated into movement vectors R{m}. For example, graph 506 may be translated into text R{m} for times t1, t2, . . . t7:

$$R\{m\} = \{C, C, D, F, E, C, F\} \qquad \text{Equation 2}$$

Each symbol at time t(n) is based on an average magnitude value for the period f(n−1) to t(n) in graph 506. Other parameters may be used to determine a symbol value for other embodiments, such as the instantaneous value of the magnitude at time t(n), the cumulative value at time t(n) or other values. It is noted that the magnitude values are not linear and the time intervals are not constant for this example.

An embodiment also has a library of string signatures G{n}, using the same symbols for detected movements in vectors R{m}. The values of the G{n} string signatures represent corresponding magnitude data for expected rotational movements. For example, an expected gesture may have the G{n} signature:

$$G\{n\} = \{B, C, D, E, F\} \qquad \text{Equation 3}$$

The gesture signatures may be longer or shorter than detected movement signatures.

An embodiment may build a set of detected strings and gesture signatures based on any of one or more of the $\alpha$, $\beta$ and $\gamma$ indices.

As the R{m} string is built for device 10 as it moves, it may be compared against a stored gesture signature string G{n}. An embodiment analyzes the movement against the gesture and provides a degree of deviation for the movement in its R{m} string when comparing its values against the gesture signature as captured in the pattern string G{n}. For example, for a gesture having a signature G{n}={A, B, C, D, E, F}, an exemplary movement R{m}={A, B, C, F, E, F} (having a "small" deviation from the exemplary as manifest by the "F" symbol in the fourth position) may be considered to be an acceptable match for the gesture, but a second exemplary movement R{m}={A, B, C, F, A, F} (having a determined "significant" deviation from the exemplary as manifest by the "F, A" sequence in the fourth and fifth positions) may not be an acceptable match. It will be appreciated that a deviation may occur at a location in the movement. At the location the deviation may have different values. There may be more than one deviation in the movement. Each of the deviations may have "significant" and/or "insignificant" tolerances, depending on acceptable ranges for the movement. Such acceptable ranges are provided in a substitution matrix, described below.

It will be appreciated that one or more deviations (of different sizes) at different points in the gesture may be considered to be "small" or "significant" deviations (or not). Such are thresholds that may be set according to any number of paradigms, including for example through quantitative measurement of gestures and statistical analysis of a preset number of gestures. An algorithm described below provides one threshold to determine when a deviation is deemed to be "significant" and as such, outside of an acceptable measurement parameter for a gesture. Where durations exist in the string may be a factor, as well as the size of the deviation.

To execute such analysis, device 10 according to an embodiment has modules, algorithms, methods, steps and processes to attempt to identify segments of a R{m} string that are "sufficiently" similar to the G string for a gesture. When the strings are deemed to be sufficiently similar, a match is made between the gesture and the G string.

An embodiment uses local sequence alignment analysis to examine and emphasize an overall similarity between an input string and a target string. Local sequence analysis is related to edit distance analysis, but in an embodiment can find a longest sequence (or sufficiently long sequence) of similarity between two input strings and compute a normalized score, whereas edit distance may favour shorter matches to satisfy its cost-based algorithm. A Levenshtein edit distance analysis is one type of analysis. A Smith-Waterman analysis is another type.

A local sequence alignment analysis is dependent on three variables. First is a gap penalty $\Gamma$; second is a substitution matrix $S(x_i, y_j)$; and third is an adjacency matrix $A(i, j)$. Each is discussed in turn. One or more of the three variables may be used to determine alignment. The values for the variables may be weighted in determining similarity.

The gap penalty $\Gamma$ provides flexibility to an alignment by allowing empty spaces to be strategically inserted in R{m} or G{n} if such insertions maximize the overall alignment score between R{m} and G{n}. The penalty associated with $\Gamma$ is to constrain excessive insertion of gaps. The exact mathematical use of $\Gamma$ in the alignment algorithm will be seen below. The substitution matrix is mathematically derived directly from the adjacency matrix:

$$S(i,j) = 2I(i,j) - E(i,j) - 2A(i,j) \qquad \text{Equation 4}$$

Where I is an identity matrix, and E is a matrix of all 1's.

The substitution matrix used by an algorithm is based on the geometrical relationships and/or spacing between the y-axis scale levels of FIG. 5, and is expressed in terms of an adjacency matrix $A(i, j)$. The adjacency matrix forms a basis for the substitution matrix, discussed next.

One use of the substitution matrix $S(x_i, y_j)$ is to provide robustness to the gesture detection algorithm. It does so by providing information on what characters in R{m} may be substituted (within threshold parameters) for another character to achieve a higher matching score with a G{n}. In other words, the substitution matrix can identify motions in R{m} that are sufficiently similar to motions encoded and stored in the gesture signature encoded by the pattern string G{n}.

For this disclosure, direct adjacency of the y-axis levels is referred to as a "first order" adjacency, as only those y-axis points which are direct neighbours may be substituted without penalty in a string matching algorithm. In an embodiment, the first order adjacency may be extended. In one extension, the substitution may include a penalty proportional to the distance the substitution symbol on the y-axis is from the matching symbol in the gesture signature encoded in the pattern string G{n}.

As noted, a gap penalty Γ provides flexibility to an alignment strategy by allowing empty spaces to be strategically inserted if such insertions maximize the overall alignment score. A linear gap penalty reduces the overall score match in proportion to the number of gaps inserted, but alternative gap penalties per sequence analysis paradigms may be utilized.

In one embodiment, local sequence alignment is evaluated through a recursive process. Local sequence alignment may be part of an evaluation conducted in state 308 of FIG. 3. Therein, two strings R{m} and G{n}, a substitution matrix with entries $S(x_i, y_j)$ and a linear gap penalty Γ are provided. A dynamic programming matrix D(i, j) may be computed providing a measure of alignment between R{m} and G{n}. The matrix D(i, j) may be defined recursively as described below.

Referring to FIG. 6A, further detail is provided on an algorithm to compare a text string to a pattern string. In order to provide tracking of historical data of a text string, it has been found that the Smith-Waterman algorithm may be modified to and used to build a matrix of movement data R{m} and gesture data G{n}. The Smith-Waterman algorithm produces an alignment score between R{m} to G{n}, defined as the maximum value in the dynamic programming matrix D(i, j). The alignment score may be quoted as an alignment percentage, i.e. a percentage of the maximum possible alignment where R{m} is identical to G{n}. For the examples shown, the symbols used to represent magnitudes of rotational values is expressed as two-character hexadecimal values, 00-FF, providing 255 levels of magnitudes that can be quantized.

In one embodiment, device 10 produces data relating to detected movements of device 10 at a predefined, regular rate. This data is used to build text strings R{m}. In the modified algorithm, detected strings R{m} and G{n} are entered in the left side and top respectively in matrix D(i, j), where m and n are the lengths of R and G respectively. In one implementation for an embodiment the R{m} and G{n} strings are expressed with base 16 integer enumeration symbols. The leftmost column and top row of D(i, j) are initialized respectively as follows:

$$D(i,0)=0, i=0 \ldots m$$

$$D(0,j)=0, j=0 \ldots n$$

The remaining matrix elements are computed recursively, where entries in D(i, j) are computed through a recursive formula that fills out the current row, left to right, by using values the previous row and/or columns, and as modified by values of the $S(x_i, y_j)$ or the gap penalty Γ. Entries for D(i, j) are set to be the minimum value of 0 or one of three surrounding entries as follows:

$$D(i, j) = \max\{0 \text{ [or] } D(i-1, j) + \Gamma \text{ [or] } D(i, j-1) + \Gamma \text{ [or] } D(i-1, j-1) + S(x_i, y_j)\} \quad \text{Equation 5}$$

$$\text{For } i = 1 \ldots m, j = 1 \ldots n$$

An exemplary D(i, j) is shown in FIG. 6A, where the enumeration symbols in R{m} and G{n} are base 16 integers and:

$$\Gamma = -\frac{1}{2}; \quad \text{Equation 6}$$

$$R\{m\} = \{A2, FF, C7, C0, C2, A2, C2, BF, FF\}; \quad \text{Equation 7}$$

$$G\{n\} = \{BF, C0, C2, C4, C7\}; \quad \text{Equation 8}$$

and $S(x_i, y_j)$ is as defined in FIG. 6C.

Referring to FIG. 6A, the maximum value found in D(i, j) is 4.5, therefore by definition the alignment score is 4.5. Given the $S(x_i, y_j)$ where each alignment adds 1 to the alignment score, the maximum ("best") possible alignment with G{n=5} would produce a score of 5, where received symbol in the text string is an exact match to the corresponding five elements in the pattern string. As such, an alignment score of 4.5 provides 90% alignment (4.5/5) with an exact match. It is understood that the alignment score may be a function of Γ and of $S(x_i, y_j)$. Such values may be carefully selected in view of particular real-time contexts for an embodiment. The threshold for the alignment score may be set to be any suitable value for an implementation. The threshold value may change during operation of an embodiment.

An embodiment analyzes the movement R{m} against the gesture signature G{n} and provides a degree of deviation of the movement R{m} against the gesture signature as captured in the pattern string G{n}. In the exemplary case given above in Equations 6 to 8, and the $S(x_i, y_j)$ defined in FIG. 6C, the alignment score of 4.5 corresponds to a deviation of 10%. Deviation and alignment are related by: % Deviation= (100−% Alignment).

It is appreciated from inspection of Equation 5 that it is only necessary to keep the current and previous rows of the D(i, j) matrix in memory at any point in the computation because the embodiment only requires the final score of the alignment. This provides an efficient use of computational resources. Therefore the memory required is capped at 2×n integers. It will be appreciated that the n×m traceback matrix used in standard implementations of the Smith-Waterman, is not needed for an embodiment as details of the physical alignment information is not required to obtain the simple alignment score. Again, the memory is capped at 2×n for this movement.

It will be appreciated that multiple gestures may be analyzed against a movement in one pass of an analysis of a dynamic programming matrix. Further detail on such an analysis is provided below.

Periodically, a frame of data length L is provided to the movement detection module 222F where each data in the frame is sequentially converted to an enumeration symbol. The symbol may be appended to T only if it is different from the previous symbol. It is understood therefore that the length of the final text string T may therefore be shorter than L, the data frame length, i.e. m≦L.

Contiguously repeating symbols in each frame may be identified in movement module 222F and discarded from the text string. Repeating symbols merely indicate the pre-elected chosen acceleration data sampling rate is faster than the rate of motion for an embodiment. Discarding repeated symbols improves robustness of the algorithm by reducing the dependency on the speed at which gestures are executed. Discarding contiguously repeated symbols also reduces computational overhead, especially in periods of motionlessness, or near motionlessness, where length of the text strings may approach zero for as long as the motionless or near motionlessness persists. Discarding contiguously repeated symbols also reduces the length of the text string. The string is now of length 'm' which is less than or equal to the length of the data frame L, i.e. m≦L. Exemplary benefits of reducing the string length include reducing the size of the dynamic programming matrix D(i, j), the number of calculations performed on it, and the memory required for those calculations in the gesture analysis module 222G.

Further details are provided on the analysis of a gesture signature G{n} straddling two text strings $R_1\{m'\}$ and $R_2\{m''\}$.

The standard application of the Smith-Waterman algorithm zeros out the top row of the D(i, j) matrix, and in doing so all previous alignment data is jettisoned. However, an embodiment provides retention of previous alignment data between searches. Therein, two movement text strings $R_1\{m'\}$ and $R_2\{m''\}$ may be processed together such that alignment information gained in $R_1\{m'\}$ is carried into an alignment evaluation of $R_2\{m''\}$. Such retention is useful when a detected gesture straddles two consecutive text strings $R_1\{m'\}$ and $R_2\{m''\}$. Retention of such alignment data avoids having to reset the alignment state after processing $R_1\{m'\}$ when the analysis of $R_2\{m''\}$ commences, as would be the case in prior art Smith-Waterman analysis techniques.

When a gesture straddles two sequential text strings, an embodiment can still identify the gesture. This is demonstrated by breaking the exemplary string from Equation 8 into two segments $R_1\{m'\}$ and $R_2\{m''\}$, namely:

$$R\{m\}=R_1\{m'\}\oplus R_2\{m''\}; \quad \text{Equation 9}$$

where: ⊕ is a string concatenation operator.
The index convention is m=m'+m", where m'=4; m"=5, and where:

$$R_1\{m'\}=\{A2,FF,C7,C0\}; \quad \text{Equation 10}$$

$$R_2\{m'\}=\{C2,A2,C2,BF,FF\}; \quad \text{Equation 11}$$

and where G{n} and Γ are defined in Equations 8 and 6 respectively. Substitution matrix $S(x_i, y_j)$ remains as defined in FIG. 6C. The dynamic programming matrices of $R_1\{m'\}$ and $R_2\{m''\}$ are denoted $D_1(i, j)$ and $D_2(i, j)$ respectively.

In the embodiment, the largest matrix element found in the pair $D_1(i, j)$ and $D_2(i, j)$ is identical to the largest matrix element found in the concatenated matrix D(i, j), which is a modification from the known the Smith-Waterman algorithm. The embodiment processes the matrix by simply initializing the top row of $D_2(i, j)$ by the last row $D_1(i, j)$, i.e. by having:

$$D_2(i=0,j)=D_1(m=\text{last},j) \text{ for } j=0 \ldots n \quad \text{Equation 12}$$

As such, it can be see that an embodiment provides a time-domain component to processing text strings, which expand upon features of the Smith-Waterman algorithm.

Further details of the embodiment are provided through processing of an exemplary case.

In an example, an embodiment constructs two matrices $D_1(i, j)$ and $D_2(i, j)$ by placing $R_1\{m'\}$ and $R_2\{m''\}$ along the sides of each matrix respectively and placing G{n} along the top of both and computing the elements according to Equation 6. Using the values of G{n}, Γ, and $S(x_i, y_j)$ as before, an embodiment builds $D_1(i, j)$ and $D_2(i, j)$ as shown in FIG. 6B. It can be seen that the same maximum value (i.e. alignment score, indicated in figure) is computed for the pair $D_1(i, j)$ and $D_2(i, j)$ than as the single D(i, j) matrix shown in FIG. 6A.

It will be appreciated that a continuous selection of text string pairs can be processed in the fashion described above to ensure that the alignment score is built, over time, and continuously, until such time as a threshold is met and the gesture analysis module activates a signal or process to execute a command associated with the recognised gesture. Only at such time is the alignment score reset. The algorithm may be applied to string 1 and string 2, then to string 2 and string 3, and so on. As such, alignment data in string 1 propagates to string 2, string 3 and so on without temporal interruption.

It will be appreciated that in other embodiments, multiple alignment scores may be provided simultaneously for each data frame string R{m}, where efficiencies for simultaneous gesture detections may be provided by extending the number of columns of D(i, j) to encompass all desired gesture signatures G{ }.

Referring to FIG. 6D, a D(i, j) matrix is constructed with data frame string R{m} on the left and two gesture signatures G1{n} and G2{n'} along the top. A column of zeroes is inserted between the gesture signatures to provide correct results. It is seen that the maximum alignment for G1{n} is 4.5 with corresponding alignment percentage of 90% (4.5/5) while the alignment percentage of G2{n'} is 100% (6/6), therefore G2{n} would be selected as the matching pattern. It will be appreciated that the D(i, j) matrix may be extended in similar fashion to provide simultaneous processing of as many gesture signatures as an embodiment requires.

Figure 7:
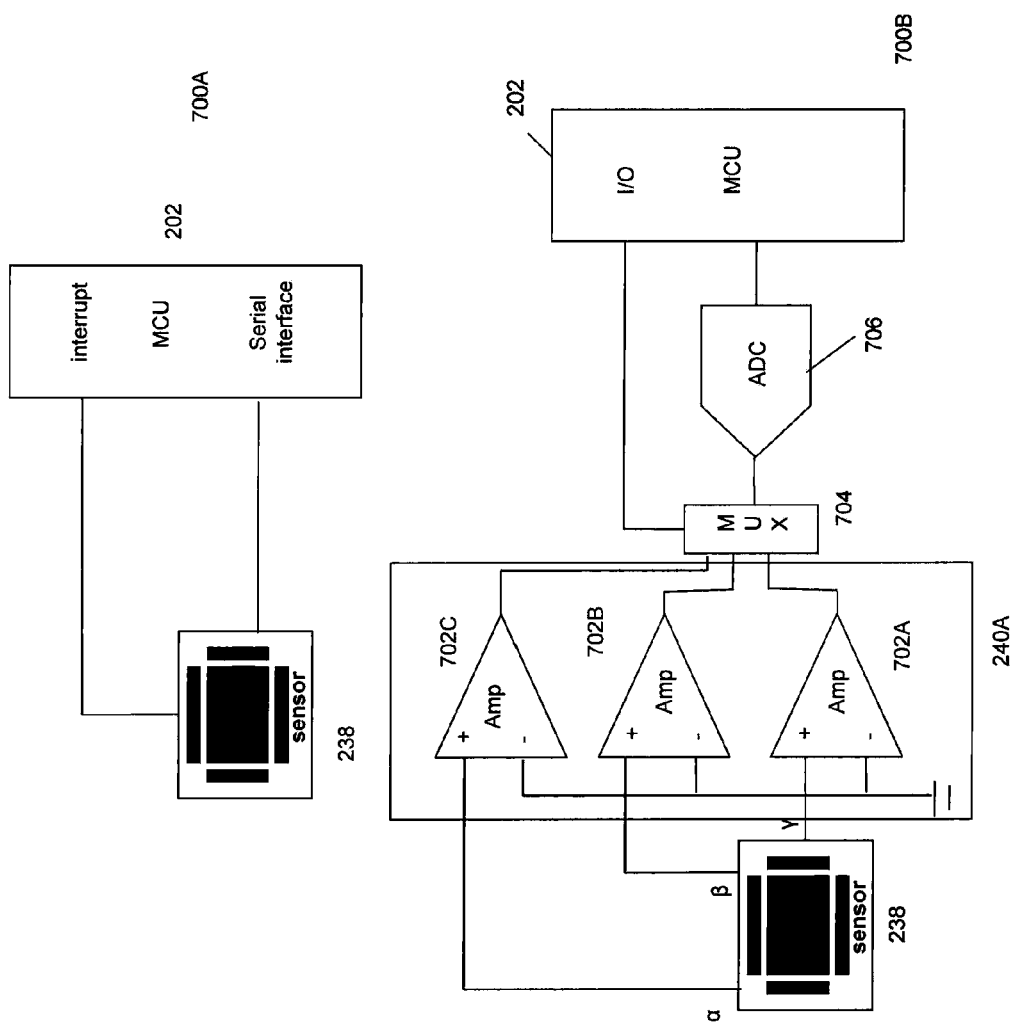
FIG. 7 is a block diagram of two movement detection systems of the embodiment of FIG. 1.

Referring to FIG. 7, with some algorithms of an embodiment described, further detail is provided on how aspects of the embodiment are implemented in device 10 through movement detection module 204 and its related components. A gyroscope is used as a sensor to detect rotational movements around the x, y, and z axis, as indicated in FIG. 4 by α, β and γ. Therein, two sensors arrangements for device 10 are shown. Circuit 700A shows gyroscope sensor 238 directly connected to the interrupt and serial interface input lines of microprocessor 202. Accordingly, software operating on microprocessor 202 is provided to selectively monitor signal(s) from sensor 238 to determine whether a notable movement of device 10 has been detected. The circuit between sensor 238 and microprocessor 202 can be considered to be one version of circuit 240. Software operating on microprocessor 202 determines when a notable signal has been generated by sensor 238. Circuit 700B shows gyroscope sensor 238 connected to trigger circuit 240A having three differential comparators 702A, B and C, which then have their outputs attached to an analog mux 704. The mux selectively provides its output according to a control signal generated by microprocessor 202. The analog output of mux 704 is converted to a set of digital signals by analog to digital converter 706, which then provides the output to microprocessor 202. As with other implementation, software operating on microprocessor 202 determines when a notable signal has been generated by sensor 238. Reading of positions determined by the software can be stored in memory 218 or 216. The software can also create an average reading of the movement readings. This average reading can be used to determine when device 10 is in a resting position or when it is effectively in a resting position (e.g. it is being moved only in inconsequential amounts).

For any embodiment, a gyroscope may be used for motion sensor 238. Further, the gyroscope may be of almost any type, including an inertial, capacitive, piezoelectric, piezoresistive, or a gas-based gyroscope. An exemplary gyroscope is model ADIS16350 High Precision Tri-Axis Inertial Sensor from Analog Devices, Inc. Gyroscopes sense and convert a rotational motion into an electrical signal (producing a corresponding change in output) and are available in one, two or three axis configurations. Gyroscopes may produce digital or analog output signals.

To improve sensitivies of a gyroscope when it is used as motion sensor 238, its outputs can be calibrated to compensate for individual axis offset, center of gravity issues for device 10 in regards to the location of sensor 238 with its casing and sensitivity variations. Calibrations can also be performed at the system level, providing end-to-end calibration. Calibrations can also be performed by collecting a large set of measurements with the device in different orientations.

Figure 8:
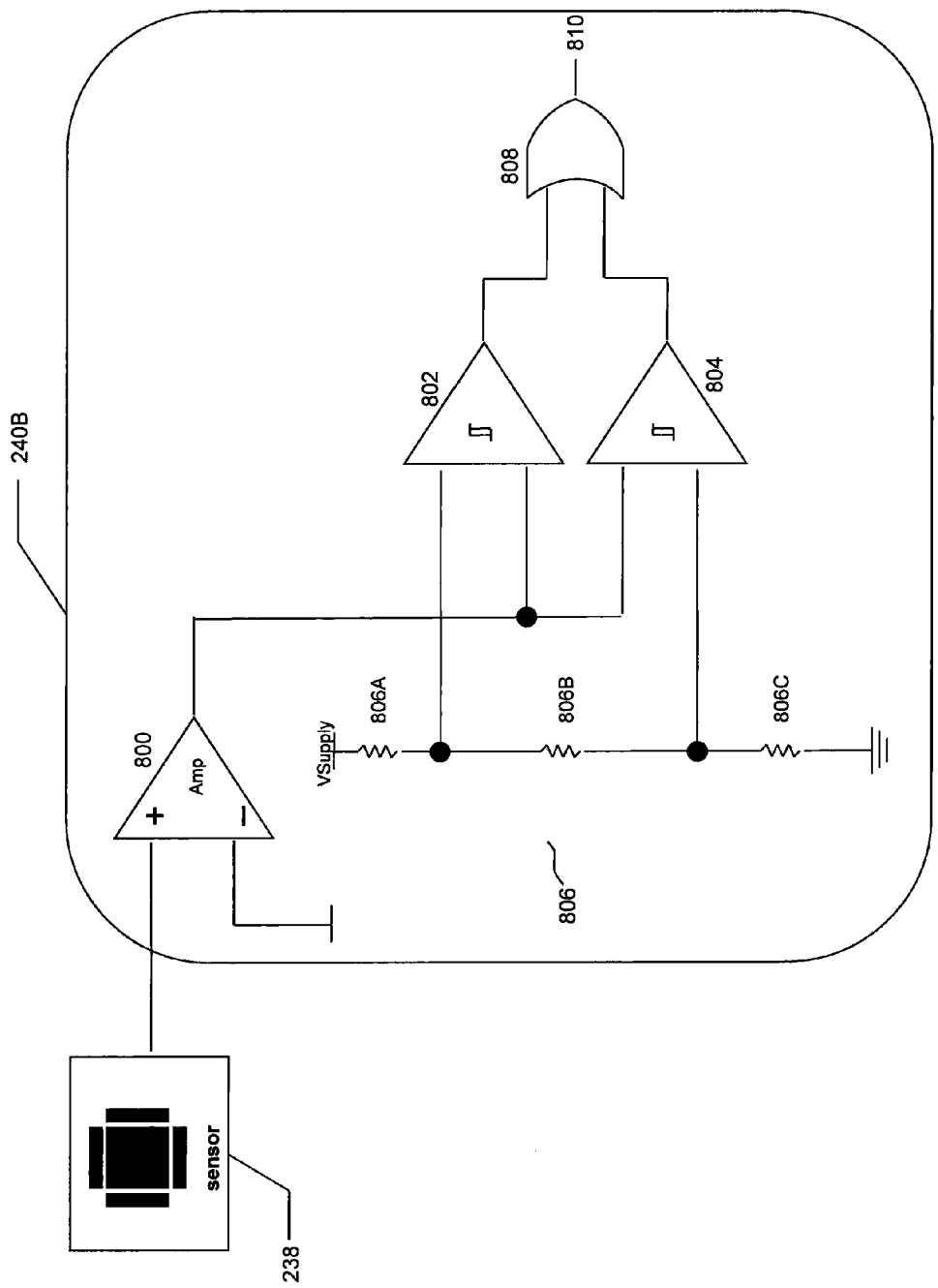
FIG. 8 is a block diagram of an alternative movement detection system the embodiment of FIG. 1.

Referring to FIG. 8, an alternative circuit 240B is shown for sensor 238 which is aligned as a single axis analog sensor. Sensor 238 can be oriented such that its output detects a rotational movement along a desired axis (e.g. 'α' axis detecting when device 10 is moved forward). Additional axes may be monitored by replicating circuit 240B for each additional axis. Briefly, the output of sensor 238 is provided to buffer amp 800. The output of buffer amp 800 is provided in tandem to comparators 802 and 804. The other inputs of comparators 802 and 804 are taken from different taps on resistor ladder 1206, comprising resistors 806A, 806B and 806C. Comparators 802 and 804 each produce upper and lower limit comparison signals for the output of sensor 238. If the value of the signal from sensor 238 is either above the upper limit set by the parameters of comparator 802 (comparing the signal from sensor 238 against its tap from the resistor ladder 806) or below the lower limit set by the parameters of comparator 804 (comparing the signal from sensor 238 against its tap from the resistor ladder 806) then OR gate 808 generates a trigger signal 810. It will be appreciated that the limits can be used to define a range of signals detected by sensor 238 representing when be device 10 is either stationary (e.g. at rest) or being moved.

It will be appreciated that other circuits using different combinations of sensors and triggering components and threshold detectors may be used to provide functionalities of sensor 238 and circuit 240.

It will be appreciated that the movement detection module 222F and the gesture recognition module 222G may be transcribed or otherwise modified into a touch screen environment.

Other movements may be tracked by device 10. Linear movements and/or accelerations may be detected by an accelerometer or other movement sensing device installed in device 10, which is provided in addition to sensor 238. A separate movement detection module and gesture recognition module for the accelerometer (akin to modules 222F and 222G) may be provided in hardware, software and/or firmware on device 10, having comparable functionality as described for modules 222F and 222G, but applied to processing linear acceleration data from the accelerometer. The accelerometer may track linear movements in one, two or three dimensions (along the x, y and z axis of movement of device 10). In an embodiment, another motion sensor may be provided in addition to or instead of sensor 238, such as a spring-loaded switch, a tilt switch, a mercury switch, a GPS locator or any other device which can generate a signal responsive to movement or change in orientation of device 10. It is preferable that the device have low quiescent power draw characteristics.

When there are two movement detectors (e.g. a rotational movement detector and a linear movement/acceleration detector), an embodiment provides additional gesture analysis. It will be seen that a gesture may impart linear and/or rotational movements on device 10. For example, consider a class of gestures that have a rotational component and no significant linear movement component. An example, is to spin device 10 when it is resting on a table. As such, a rotational movement is detectable, but not any significant linear movement/acceleration movement. A second class of gestures may have a linear movement and no significant rotational movement. A third class of gestures may have both linear movements and rotational movements.

In view of an embodiment being able to track rotational and linear movements, an embodiment may also use rotational movement data with other movement data to determine whether a gesture has been imparted on device 10. The other data may include other movement processing data from other sensors, such as accelerometer data, keyboard data, GPS data or other data associated with device 10. In particular, details are provided on an embodiment that tracks and analyzes rotational movement and linear movements/accelerations.

First, detail is provided how an embodiment tracks linear movements/accelerations with an accelerometer. Earlier, FIGS. 6A-6D and their related sections in the disclosure identified an algorithm for mapping rotational movements to character strings (R{m}) and comparing such character strings to preset templates of gestures (G{n}). An embodiment, using its linear movement detector (such as an accelerometer) and its movement detection module and gesture recognition module, provides comparable algorithms for mapping detected linear accelerations against expected patterns.

As with rotational movements, linear movements may be mapped in a discrete sequence of enumeration symbols representing detected total acceleration vectors by device 10. A linear acceleration sequence of movements of device 10 may be expressed as a sequence of enumeration symbols. As with rotational movements, the sequence is referred to as a 'text string', but the linear text string is denoted by T{o} where 'o' is the length of the string. As with rotational movements, predefined text strings for a gesture are identified as 'pattern strings' but the linear pattern string is denoted by P{p}; where 'p' is the length of the string. It will be appreciated that the described quantization scheme for linear motion may be changed to different degrees of precision by capturing more or less snapshots in time. Labels for the positions of the total acceleration vector may use letters, integers, or any other convenient enumeration. Also, time and distance spacing of the enumeration symbols may be uniform or non-uniform depending on an embodiment.

Figure 9:
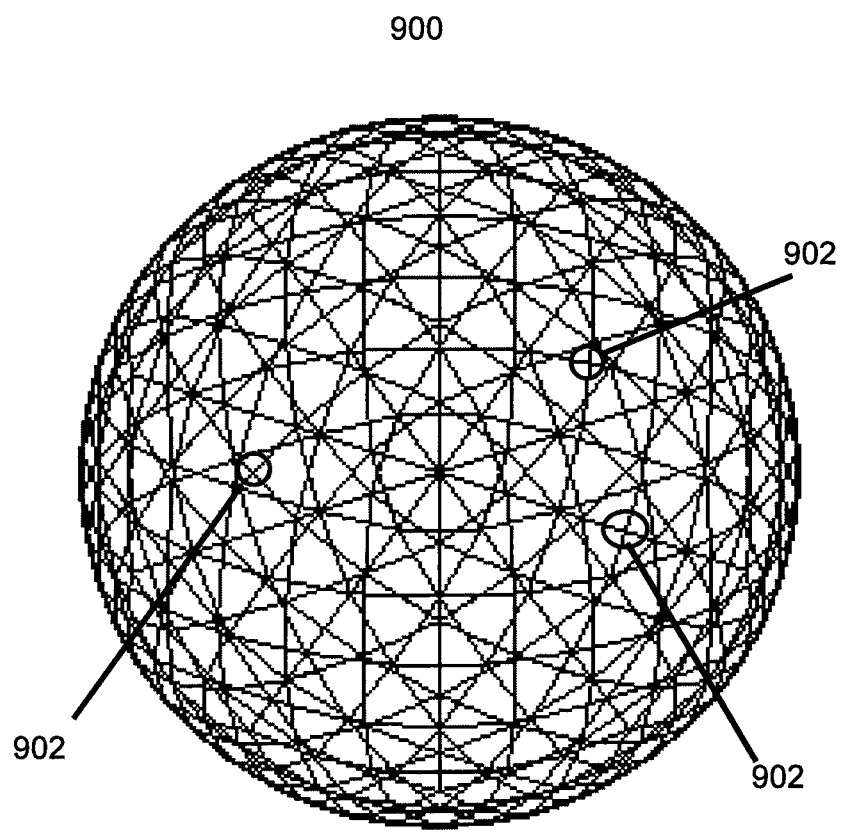
FIG. 9 is a schematic block diagram of a coordinate model based on a five-frequency (5V) icosahedron used in an embodiment of the device of FIG. 1.

Referring to FIG. 9, to provide consistent cataloguing of movements for device 10, a coordinate reference is provided that is fixed relative to device 10, including having a reference map, such as spherical cartographically fixed to device 10 and having enumeration symbols fixed to predetermined locations on the reference map. Using an exemplary fixed coordinate system, an embodiment can track and map the sum of gravitational and "proper" linear accelerations.

When enumeration symbols are fixed on the points of intersection of lines on the wireframe sphere of FIG. 9, and the wireframe sphere is fixed to the coordinates of device 10, then a quantization scheme for movements can be extended to include orientation changes of the device relative to the Earth due to the static nature of gravitational acceleration. The coordinate system, defined by the intersection of lines in the wireframe model of FIG. 9 provides a spherical locus of points from the origin for the device. The locus of points may have icosahedral symmetry.

For an embodiment tracking linear movements/accelerations, spherical shell 900 is provided to define a space around device 10. Spherical shell 900 is a reference shell that is notionally fixed to device 10. Shell 900 is an arrangement having regularly spaced points 902 on its surface. Three points are labelled. In another embodiment a mapping may be provided as a five (5) frequency (V), or a 5V icosahedron shell. A 5V icosahedron shell has two hundred and fifty two (252) points on its surface. The shell may be normalized to unit radius for convenience. Shell 900 may have icosahedral symmetry. Each point 902 is provided with a unique label (at least locally) on shell 900. Movements and gestures can be tracked as a component of a detected linear movement (per the total acceleration vector detected by device 10) crosses one or more points 902 on shell 900.

In other embodiments, other spherical covering schemes may be used employing greater or fewer numbers of vertices and different symmetries and/or arrangements of vertices. For example, the points formed by the intersection of a series of lines of longitude and latitude may be used. For any given covering scheme, for each motion, an embodiment provides a scheme to compute, identify, or select a vertex which is closest to each data point in a particular linear gesture from the data provided from the accelerometer. As such, a particular linear motion (i.e. a gesture) may be converted to a sequence of vertices which is represented by a text string T{o}.

The spacing and number vertices determine the precision of the mapping, i.e. the quantized gestures into linear strings by an algorithm in an embodiment. With exemplary mapping schemes described, further detail is provided on exemplary sequence analysis used to recognize and discriminate among the string encoded gestures of linear movements/accelerations for an embodiment. Such a sequence analysis may be provided in addition to gesture analysis module 222G and may be provided as part of state 308 of FIG. 3.

As a text string for a linear movement is generated, it can be analyzed against pattern strings of predefined gestures. When it is determined that a text string matches a pattern string, then a further analysis can be performed against results of any data provided from the previously described rotational movement analysis.

In analyzing linear movement data, previously recited analysis algorithms may be used. In particular, referring to FIG. 6A-6D, comparable matrices and analysis may be provided for linear/acceleration movements against pattern strings. In the analysis, received text strings (T{o}) derived from accelerometer data populate the vectors described for rotational data R{m} and pattern strings (P{p}) derived from expected linear patterns for gestures populate the vectors described for gesture data (G{n}). Once a matrix is populated with T{o} and P{p} data, a matching algorithm following a Smith-Waterman and/or a Levenshtein edit distance analysis can be applied.

The determination of a match for a text string involves comparisons against thresholds. There may be an exact match of a pattern or a sufficiently similar match. It will be appreciated that there are gradients as to how to determine whether a detected string is sufficiently correlated to a pattern string to consider the text string to match the pattern string. It will be seen that the linear text string and pattern string may have separate thresholds and local sequence alignment analysis for linear data. Again, linear sequence alignment data is dependent on one or more of: a gap penalty $\Gamma$, a substitution matrix $S(x_i, y_j)$; and an adjacency matrix $A(i, j)$, akin to previously described analyses, but may have separate values from those specified in the rotational movement detection scenario.

Once an assessment is provided of a detected linear movement string T{o}, against a linear movement pattern string P{p}, this assessment may be used with any of the previously described analysis relating to rotational movements tracking and processing.

As noted earlier, a gesture may have movements that contain one or both of rotational movement and/or linear movements/accelerations. When a rotational movement is detected, an embodiment may analyze the rotational movement against predetermined rotational gestures as noted above. Also, if a linear movement/acceleration detection module is provided, then the embodiment may simultaneously (or nearly simultaneously) process any detected linear movements against predetermined linear patterns as noted above.

Each rotational and linear movement analysis may have a time component associated with it. For example, for a gesture, expected rotational movement(s) may occur at different time(s) and/or simultaneously with expected linear movement(s)/acceleration(s). Also, separate tolerances and thresholds may be provided for each movement.

After the rotational and linear movements are processed, a further feature of an embodiment analyzes the two results together to determine whether a gesture has been detected. Each of the rotational and linear results may be weighted according to parameters of a gesture to provide a final threshold value that is used to determine whether a gesture has been recognized by device 10. Matching threshold values can be tuned for each type of movement for a given gesture. Different thresholds may be applied to different sections of a rotational or linear movement. Further, when combining the rotational and linear data, a function may be applied (e.g. a set of arithmetic functions, including any of adding, subtracting and/or multiplying the results) to produce a result that is used to determine whether a gesture has been recognized. As a gesture may require the absence of either a linear or rotational movement, the detection of an unexpected type of movement (over a given threshold) may be used to reject that movement as being a match for that gesture. Such analysis may be provided in stage 308 of FIG. 3 and may be implemented in one or more of modules 222F and/or 222G.

It will be appreciated that modules 222F and 222G and other applications in the embodiments can be implemented using known programming techniques, languages and algorithms. The titles of the modules are provided as a convenience to provide labels and assign functions to certain modules. It is not required that each module perform only its functions as described above. As such, specific functionalities for each application may be moved between applications, shared among or separated into different applications. Modules may be contained within other modules. Different signaling techniques may be used to communicate information between applications using known programming techniques. Known data storage, access and update algorithms allow data to be shared between applications. It will further be appreciated that other applications and systems on device 10 may be executing concurrently with any application 222. As such, one or more aspects of modules 222F and 222G may be structured to operate in as a "background" application on device 10, using programming techniques known in the art. The system may be incorporated into any electronic device, such as a communication device, a portable electronic device, a personal computer, a keyboard, keypad or the like. The firmware and software may be implemented as a series of processes and/or modules that provide the functionalities described herein. Interrupt routines may be used. Data may be stored in volatile and non-volatile devices described herein and updated by the hardware, firmware and/or software. Some of the processes may be distributed.

As used herein, the wording "and/or" is intended to represent an inclusive-or. That is, "X and/or Y" is intended to mean X or Y or both.

In this disclosure, where a threshold or measured value is provided as an approximate value (for example, when the threshold is qualified with the word "about"), a range of values will be understood to be valid for that value. For example, for a threshold stated as an approximate value, a range of about 25% larger and 25% smaller than the stated value may be used. Thresholds, values, measurements and dimensions of features are illustrative of embodiments and are not limiting unless noted. Further, as an example, a "sufficient" match with a given threshold may be a value that is within the provided threshold, having regard to the approximate value applicable to the threshold and the understood range of values (over and under) that may be applied for that threshold.

The present disclosure is defined by the claims appended hereto, with the foregoing description being merely illustrative of a preferred embodiment. Those of ordinary skill may envisage certain modifications to the foregoing embodiments which, although not explicitly discussed herein, do not depart from the scope of the disclosure, as defined by the appended claims.

The invention claimed is:

1. A method for analyzing movements of a handheld electronic device, comprising:
   calculating a matching score for a rotational string representation of rotational movement data for the device to a gesture string representing a gesture related to a command for the device by recursively traversing a matrix containing the rotational string representation, the gesture string representation and earlier movement data of the device using a distance edit algorithm to generate matching scores for values of the rotational string representation against the gesture string; and
   if a threshold for the matching score is met, executing a command associated with the gesture on the device.

2. The method for analyzing movements of a handheld electronic device as claimed in claim 1, wherein the rotational string representation is generated by:
   converting the rotational movement data to a magnitude value representing at least one axis of rotation for a rotational movement.

3. The method for analyzing movements of a handheld electronic device as claimed in claim 1, wherein a gyroscope provides the rotational movement data for the device.

4. The method for analyzing movements of a handheld electronic device as claimed in claim 1, wherein the threshold discards contiguously repeated enumeration symbols in the rotational string representation.

5. The method for analyzing movements of a handheld electronic device as claimed in claim 1, wherein the distance edit algorithm is a Smith-Waterman algorithm.

6. The method for analyzing movements of a handheld electronic device as claimed in claim 5, wherein:
   the matrix is a programming matrix D(i, j), comprising:
      dimensions m×n, where m is the length of the rotational string representation and n is the length of the gesture string, with components of the rotational string representation being identified with the m dimension and components of the gesture string being identified with the n dimension, a leftmost column $D(i,0)=0$ $i=0 \ldots m$; and a top row $D(0,j)=0, j=0 \ldots n$;
   and
   remaining elements in the matrix are set to be the minimum value of 0 or one of:

$$D(i, j) = \max\{0 \text{ [or] } D(i-1, j) + \text{a gap penalty [or] } D(i, j-1) + \text{the gap penalty [or] } D(i-1, j-1) + \text{the } i, j \text{ th entry of the substitution matrix}\}.$$

7. The method for analyzing movements of a handheld electronic device as claimed in claim 1, wherein the rotational string representation and the earlier movement data are used in calculating the matching score to determine if the gesture string straddles the rotational string representation and the earlier movement data.

8. The method for analyzing movements of a handheld electronic device as claimed in claim 1, further comprising:
   tracking linear movement data for the device;
   mapping the linear movement data to a text string representation;
   comparing the text string representation against a second string representing the gesture as a linear movement and a second threshold; and
   executing the command associated with the gesture on the device if the second threshold is met.

9. A system for analyzing movements of a handheld electronic device, comprising:
   a memory storage device;
   a microprocessor;
   a first module to generate rotational movement data for the handheld electronic device responsive to movements of the handheld electronic device;
   a second module providing instructions to the microprocessor to map the rotational movement data to a rotational string representation relating to at least one of a magnitude, speed and acceleration of a rotational movement detected along an axis of rotation for the handheld electronic device and store the string representation in the memory storage device; and
   a third module providing instructions to the microprocessor to
      calculate a matching score for the rotational string representation to a gesture string representing a gesture related to a command for the handheld electronic device by recursively traversing a matrix containing the rotational string representation, the gesture string representation and earlier movement data of the handheld electronic device using a distance edit algorithm to generate matching scores for values of the rotational string representation against the gesture string; and
      execute a command associated with the gesture on the handheld electronic device when a threshold for the matching score is met.

10. The system for analyzing movements of a handheld electronic device as claimed in claim 9, wherein the first module comprises a gyroscope.

11. The system for analyzing movements of a handheld electronic device as claimed in claim 9, wherein the third module provides instructions to the microprocessor to
   implement a Smith-Waterman algorithm for the distance edit algorithm to generate the matching scores.

12. The system for analyzing movements of a handheld electronic device as claimed in claim 11, wherein the matrix is a programming matrix D(i, j), comprising:
   dimensions m×n, where m is the length of the string representation and n is the length of the gesture string, with components of the string representation being identified with the m dimension and components of the gesture string being identified with the n dimension, a leftmost column $D(i,0)=0, i=0 \ldots m$; and a top row $D(0,j)=0, j=0 \ldots n$;

and remaining elements in the matrix are set to be the minimum value of 0 or one of:

$$D(i, j) = \max\{0 \text{ [or] } D(i-1, j) + \text{a gap penalty [or] } D(i, j-1) + \text{the gap penalty [or] } D(i-1, j-1) + \text{the } i, j \text{ th entry of the substitution matrix}\}.$$

13. The system for analyzing movements of a handheld electronic device as claimed in claim 9, wherein the third module provides instructions to the microprocessor to utilize the string representation and the earlier movement data to determine if the gesture string straddles the string representation and the earlier movement data.

14. The system for analyzing movements of a handheld electronic device as claimed in claim 9, further comprising:

a fourth module to generate linear movement data for the handheld electronic device responsive to linear movements of the handheld electronic device;

a fifth module providing instructions to the microprocessor to map the linear movement data to a text string representation and store the text string representation in the memory storage device;

a sixth module providing instructions to the microprocessor to analyze data relating to the text string representation and earlier movement data, if available, for the handheld electronic device against data relating to a linear gesture string representing the gesture; and compare the text string representation against the threshold to determine if the string representation matches the linear gesture string;

and a seventh module providing instructions to the microprocessor to process results of the third and sixth modules to determine whether to execute the command associated with the gesture on the handheld electronic device.

15. The system for analyzing movements of a handheld electronic device as claimed in claim 9, wherein the third module provides instructions to the microprocessor to discard contiguously repeated enumeration symbols in the rotational string representation.

\* \* \* \* \*